US012456332B2

United States Patent
Tanaka et al.

(10) Patent No.: US 12,456,332 B2
(45) Date of Patent: Oct. 28, 2025

(54) MOTION VISUALIZATION SYSTEM AND THE MOTION VISUALIZATION METHOD

(71) Applicant: Hitachi High-Tech Corporation, Tokyo (JP)

(72) Inventors: Takeshi Tanaka, Tokyo (JP); Daisuke Fukui, Tokyo (JP); Hiromitsu Nakagawa, Tokyo (JP); Takashi Toyomura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 255 days.

(21) Appl. No.: 18/031,263

(22) PCT Filed: Oct. 4, 2021

(86) PCT No.: PCT/JP2021/036602
§ 371 (c)(1),
(2) Date: Apr. 11, 2023

(87) PCT Pub. No.: WO2022/080165
PCT Pub. Date: Apr. 21, 2022

(65) Prior Publication Data
US 2023/0377375 A1 Nov. 23, 2023

(30) Foreign Application Priority Data
Oct. 15, 2020 (JP) ................. 2020-173653

(51) Int. Cl.
*G06V 40/20* (2022.01)
*A61B 5/11* (2006.01)
*G06T 3/60* (2024.01)

(52) U.S. Cl.
CPC ............. *G06V 40/25* (2022.01); *A61B 5/112* (2013.01); *G06T 3/60* (2013.01)

(58) Field of Classification Search
CPC . G06V 40/25; G06T 3/60; G06T 2207/30196; G06T 7/251
See application file for complete search history.

(56) References Cited

U.S. PATENT DOCUMENTS

2015/0325004 A1   11/2015   Utsunomiya et al.
2016/0030807 A1*   2/2016   Matsumoto ............. A61B 5/11
                                                       600/595

FOREIGN PATENT DOCUMENTS

CN   104035557 A   9/2014
JP   2009261595 A   11/2009
(Continued)

OTHER PUBLICATIONS

English version of WO 2014112632 A1 (Year: 2014).*
(Continued)

*Primary Examiner* — Grace Q Li
(74) *Attorney, Agent, or Firm* — Mattingly & Malur, PC

(57) ABSTRACT

A motion visualization system 1 includes a skeleton recognition program 2 obtaining joint coordinates of a target person, a pitch extraction program 6 extracting a walk cycle of the target person based on the joint coordinates, and a storage unit 106 storing a skeleton normalization program 3 transforming coordinates of the joint coordinates in a reference coordinate system where a direction in which a predetermined portion of the target person moves is set as an axis of a traveling direction in one walk cycle extracted and transforming the joint coordinates based on information on the target person.

10 Claims, 17 Drawing Sheets

(56) References Cited

FOREIGN PATENT DOCUMENTS

| | | |
|---|---|---|
| JP | 2010017447 A | 1/2010 |
| JP | 2015042241 A | 3/2015 |
| JP | 2018121930 A | 8/2018 |
| JP | 2018139902 A | 9/2018 |
| WO | WO-2014112632 A1 * | 7/2014 ........... A61B 5/1071 |

OTHER PUBLICATIONS

Yuichi Hamada, et al., "Motion Retrieval Using Random Forest Method" The IEICE transactions on information and systems D, vol. J93-D, No. 11, Nov. 1, 2010, pp. 2516-2524.
International Search Report of PCT/JP2021/036602 dated Dec. 14, 2021.

\* cited by examiner

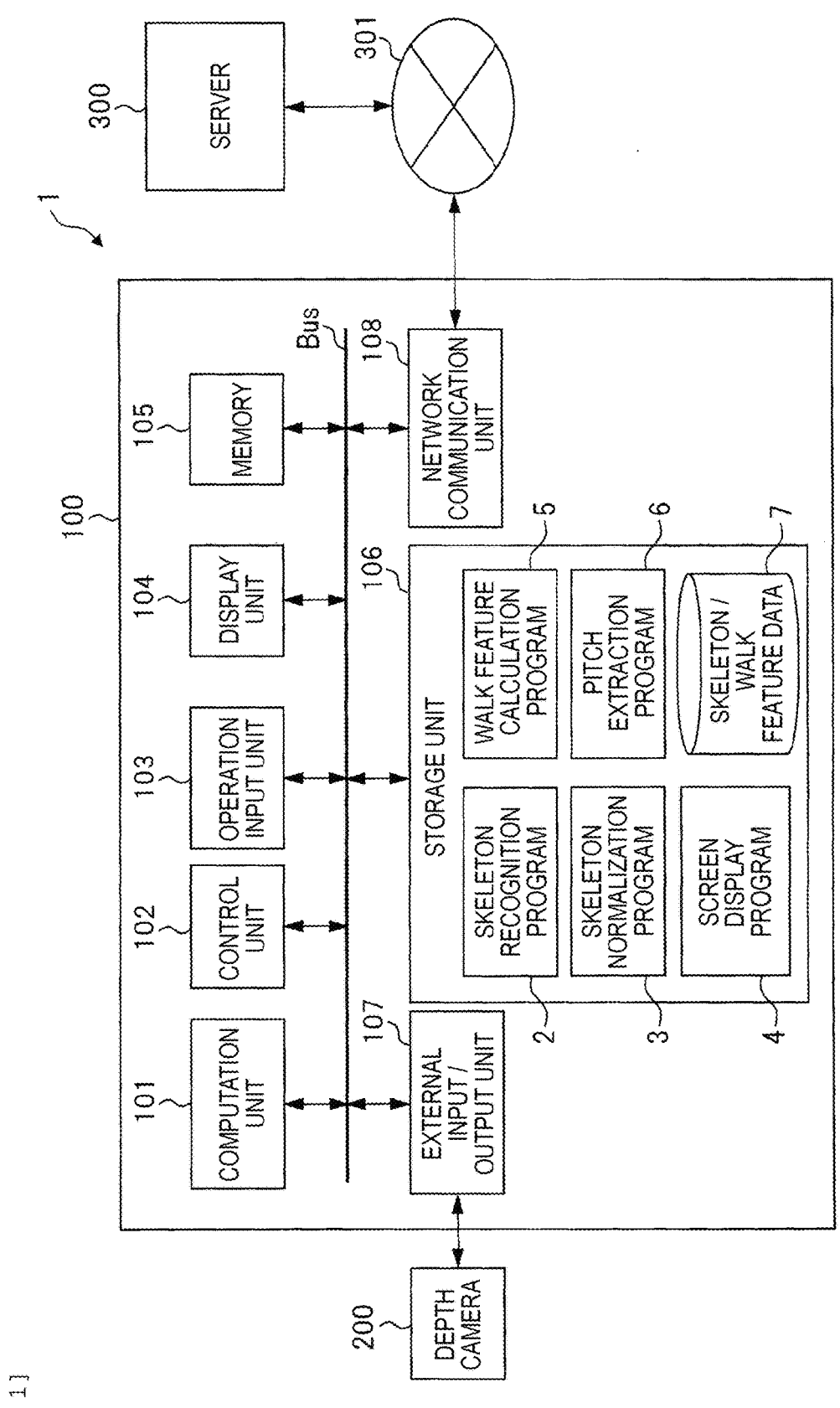
[FIG. 1]

[FIG. 2]
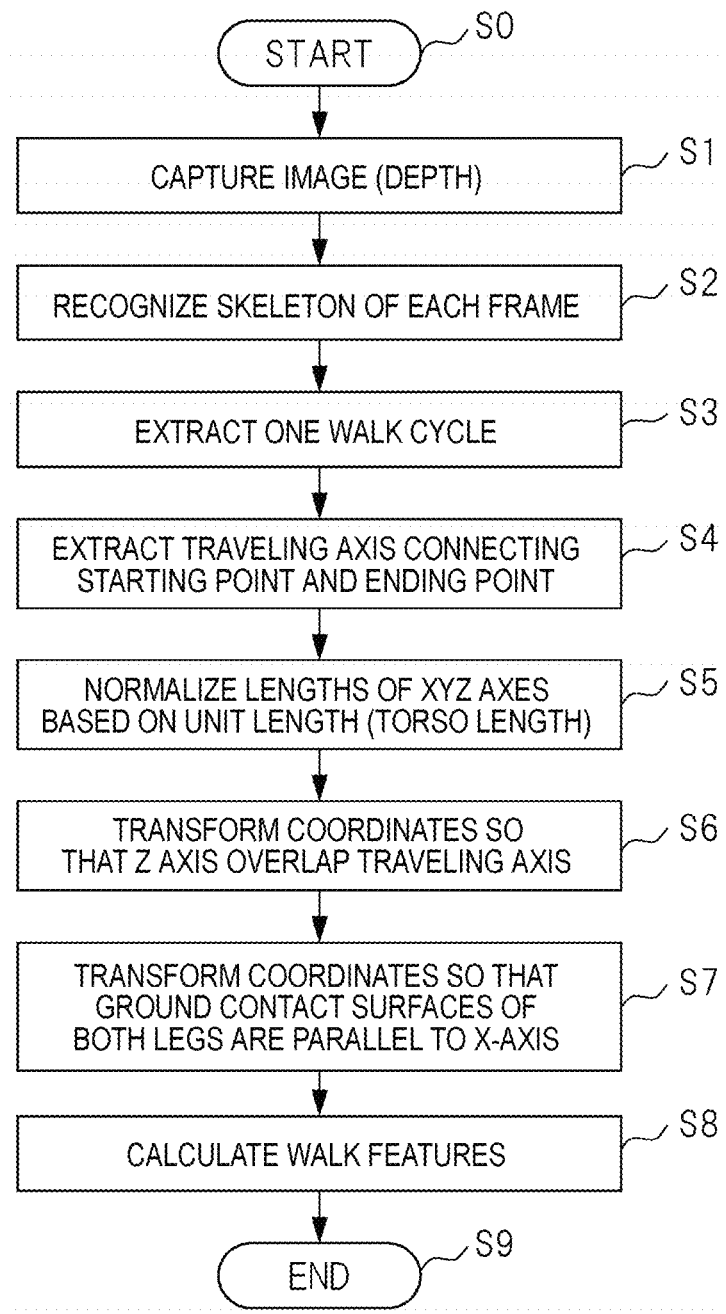

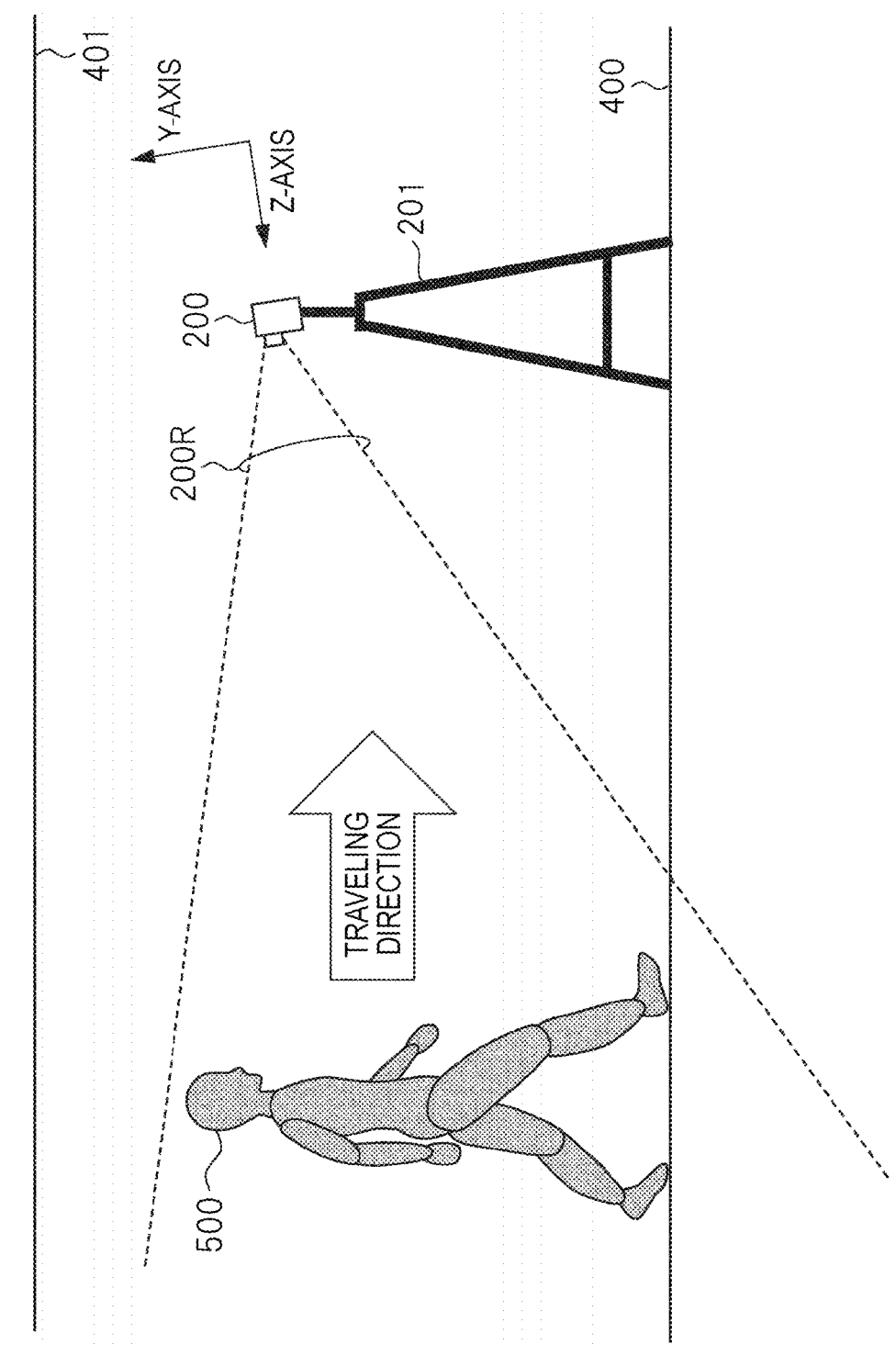
[FIG. 3]

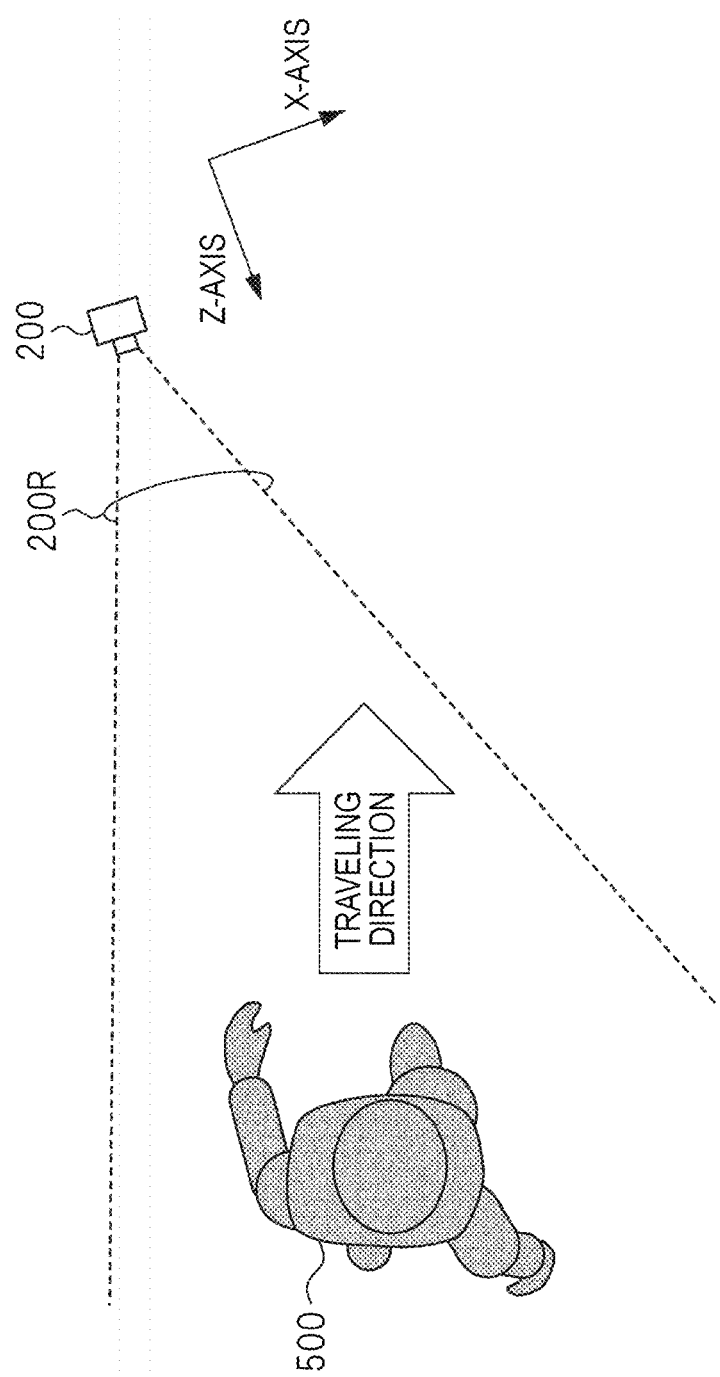
[FIG. 4]

[FIG. 5]
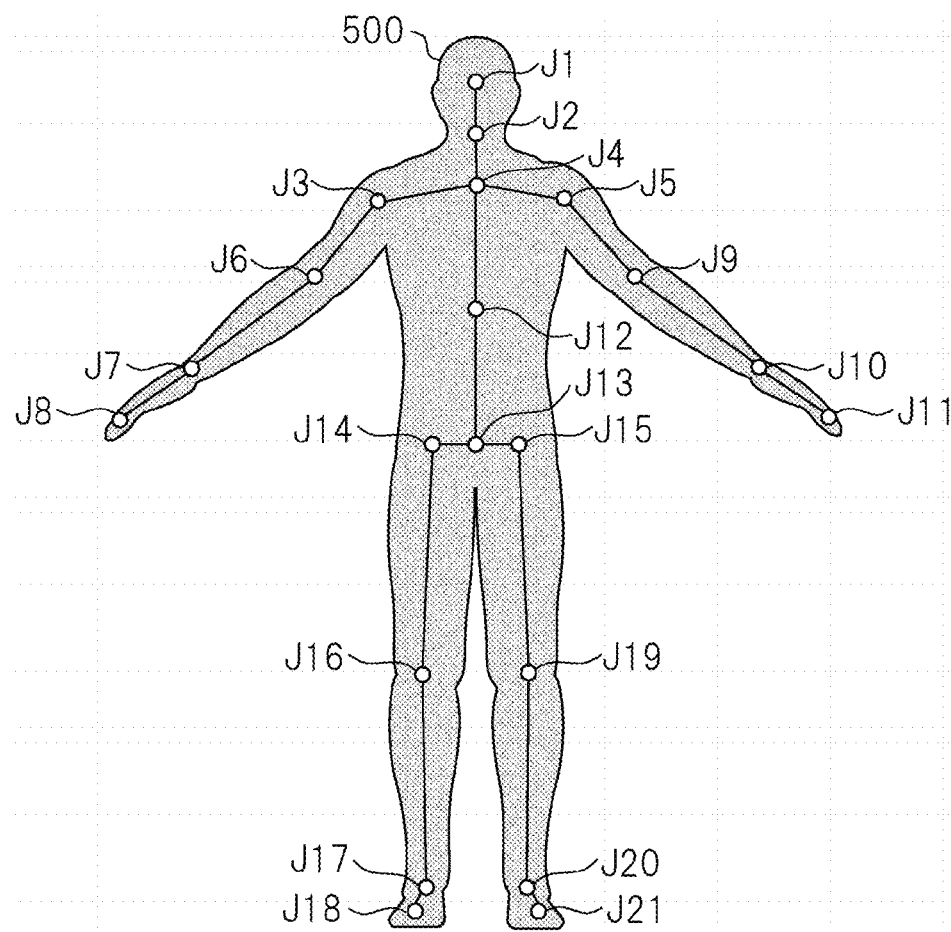

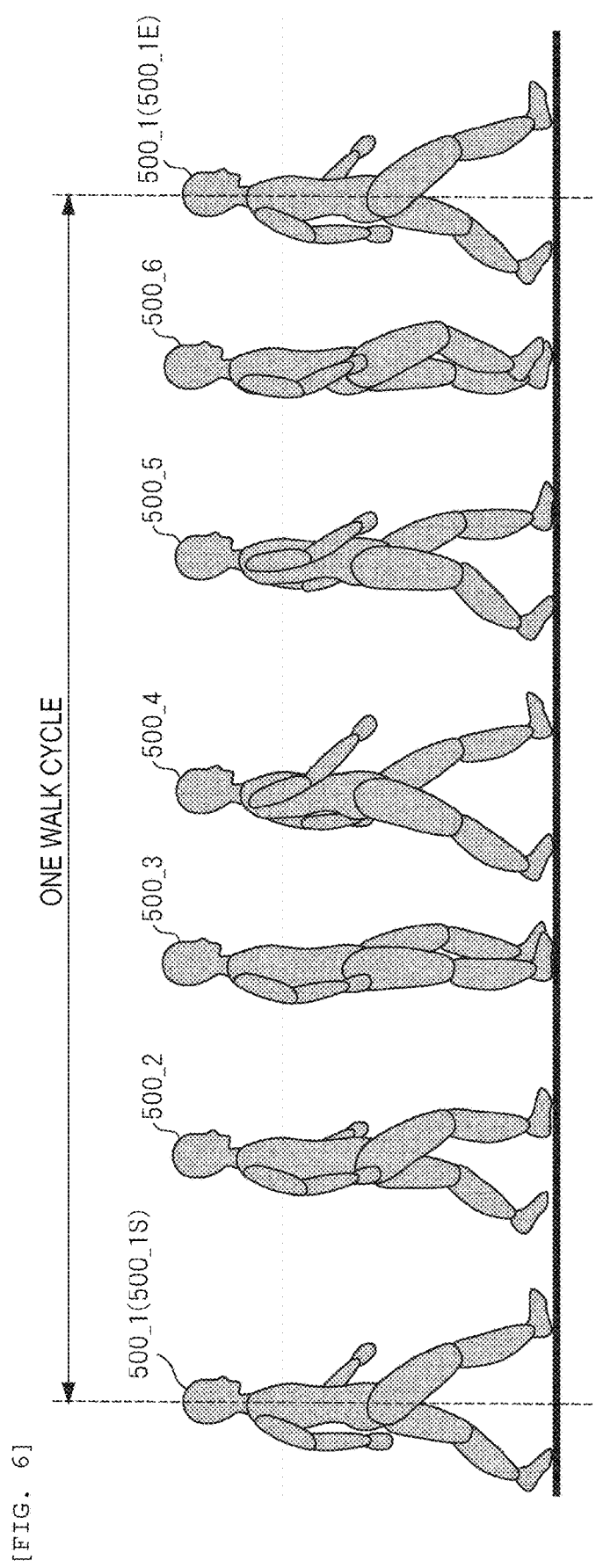

[FIG. 7]
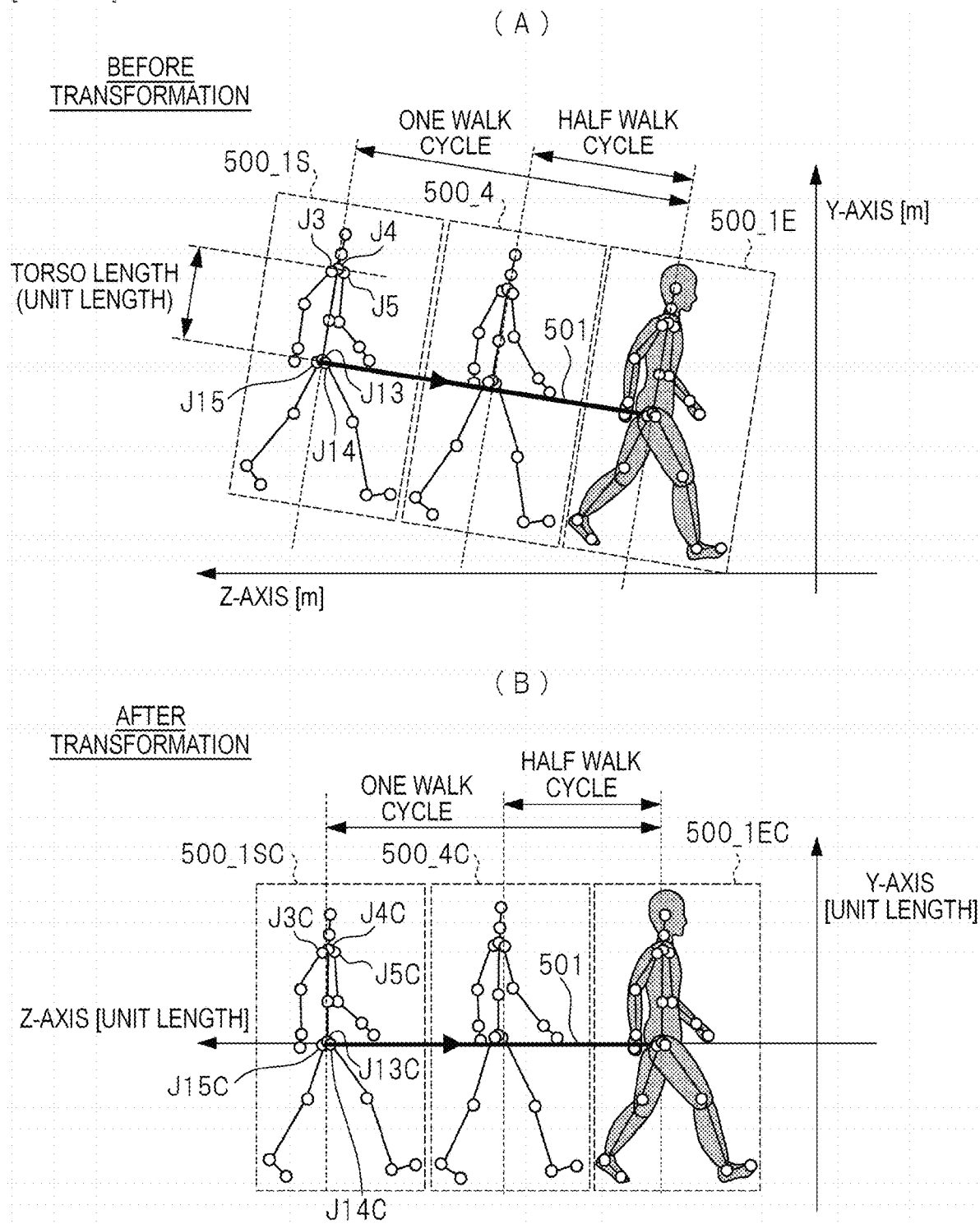

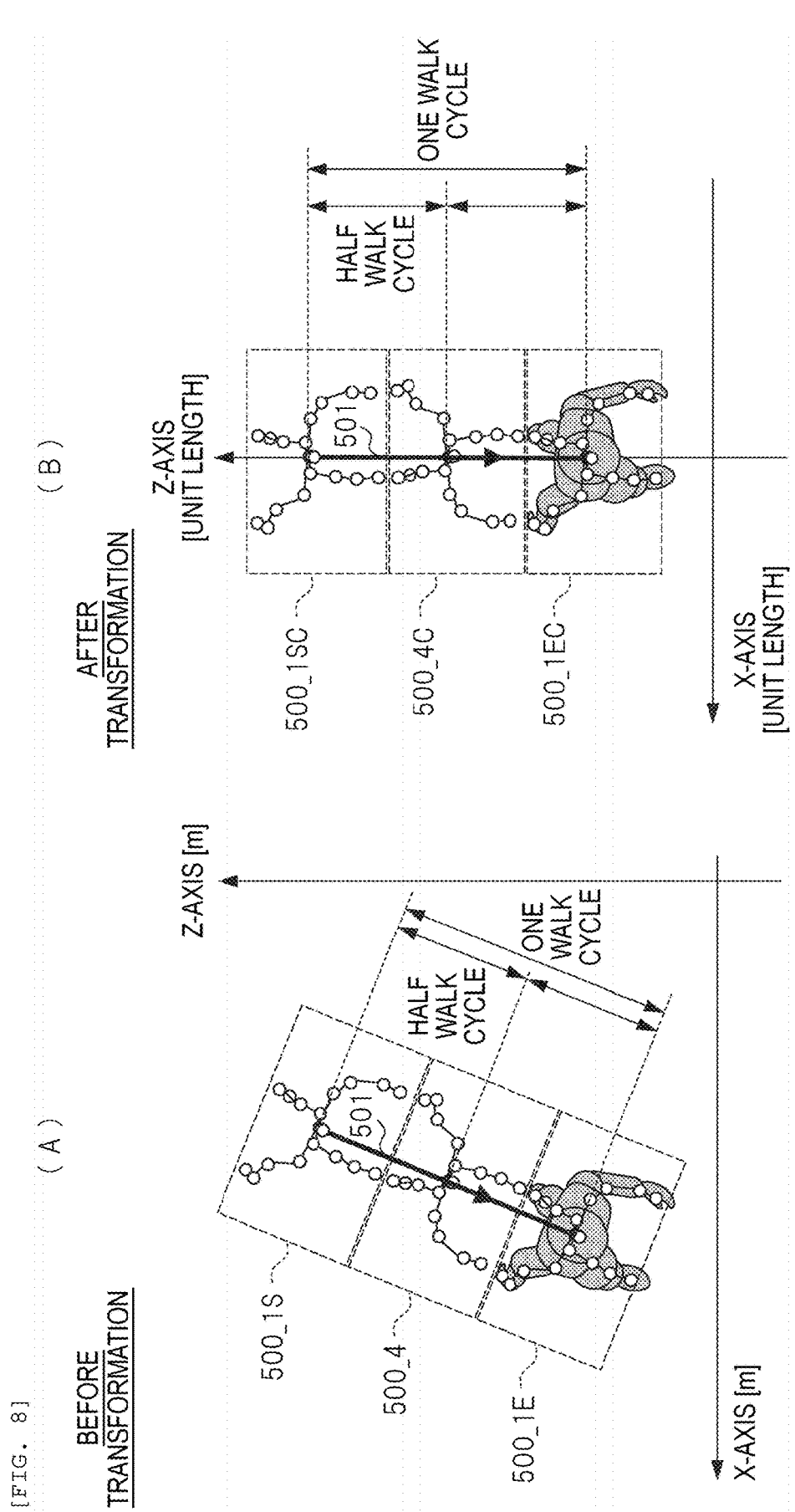

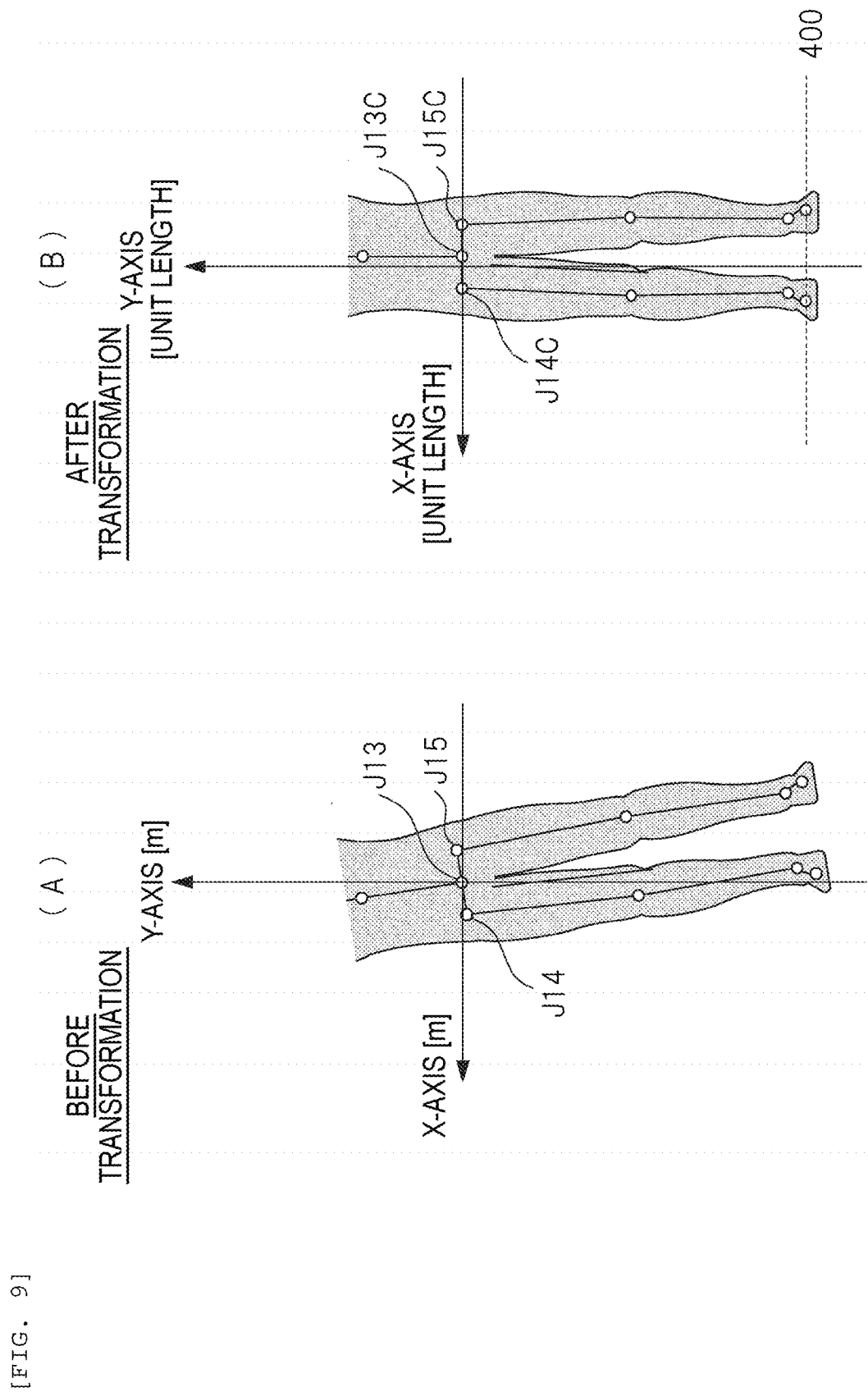

[FIG. 10]
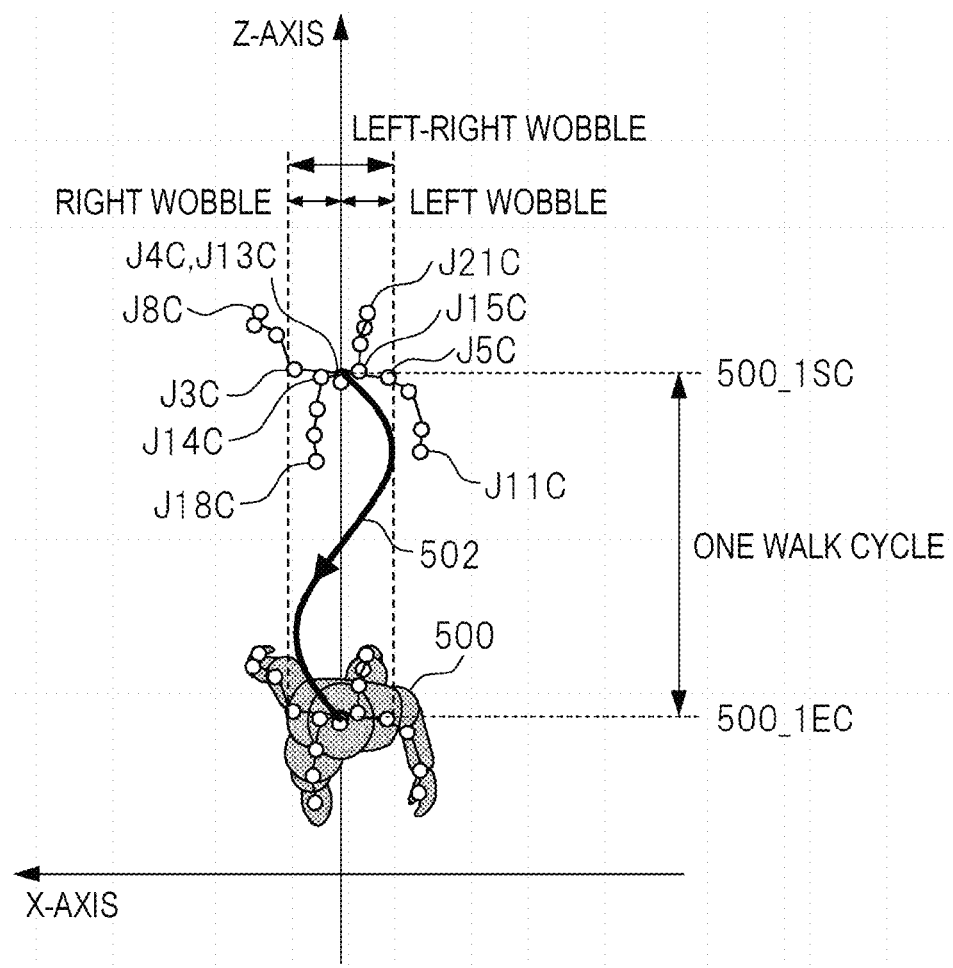

[FIG. 11]
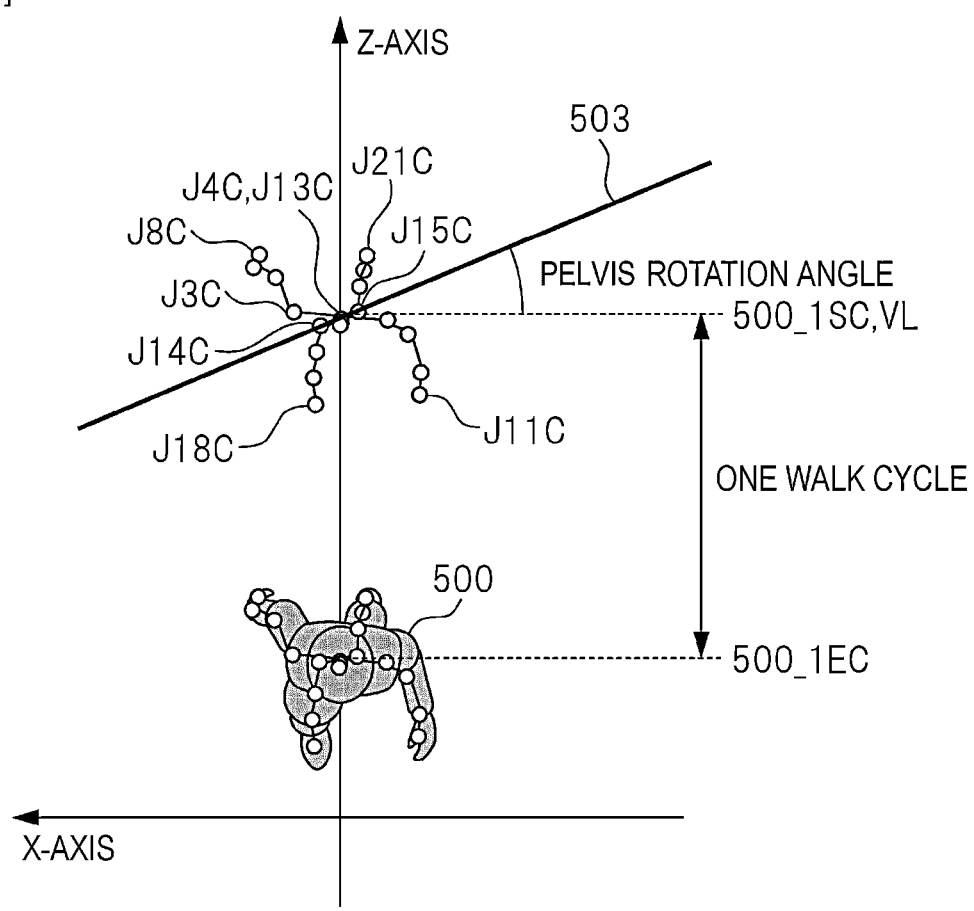

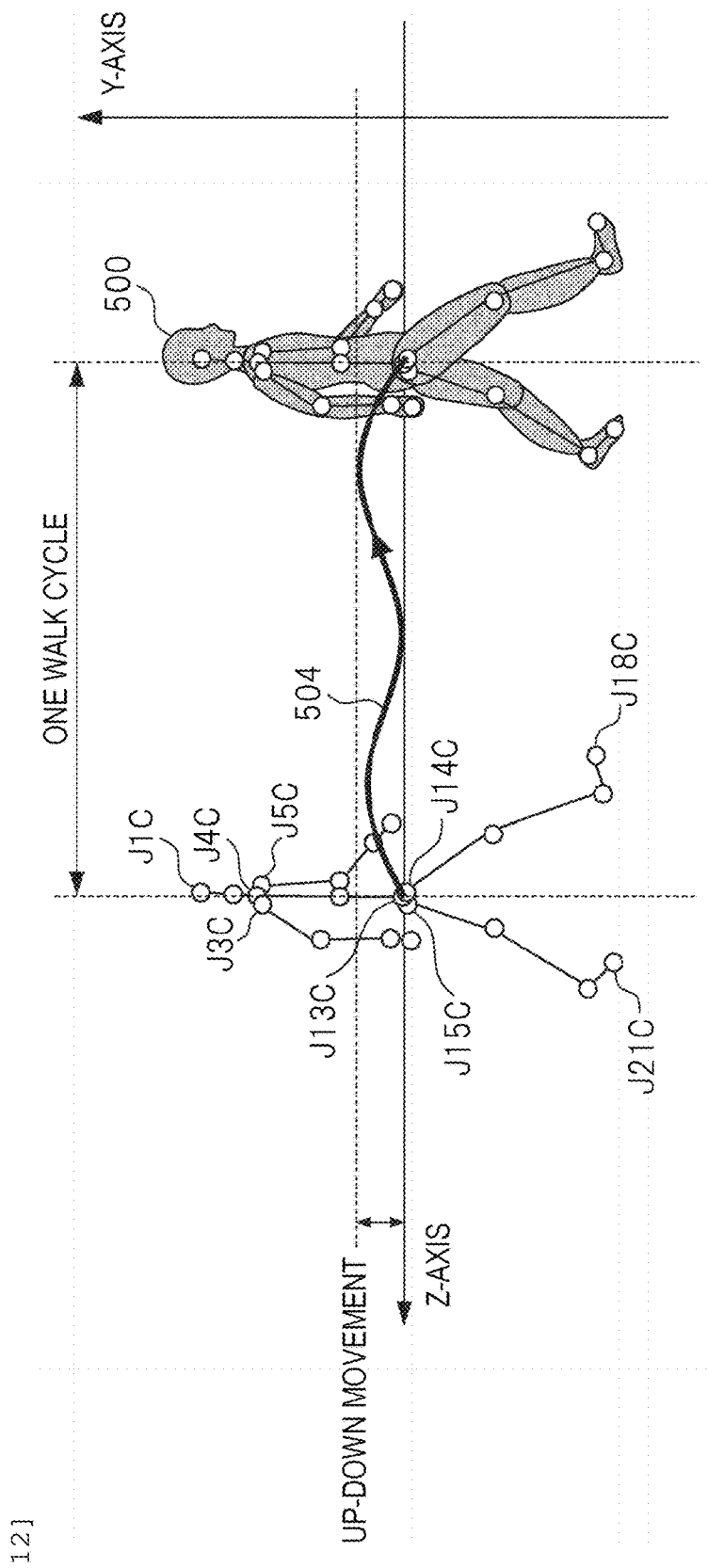
[FIG. 12]

[FIG. 13]
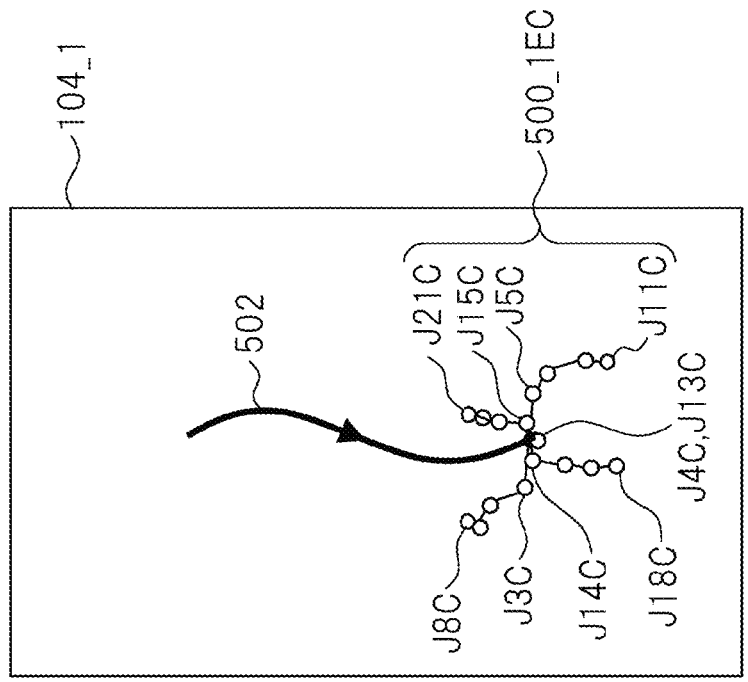
(B)
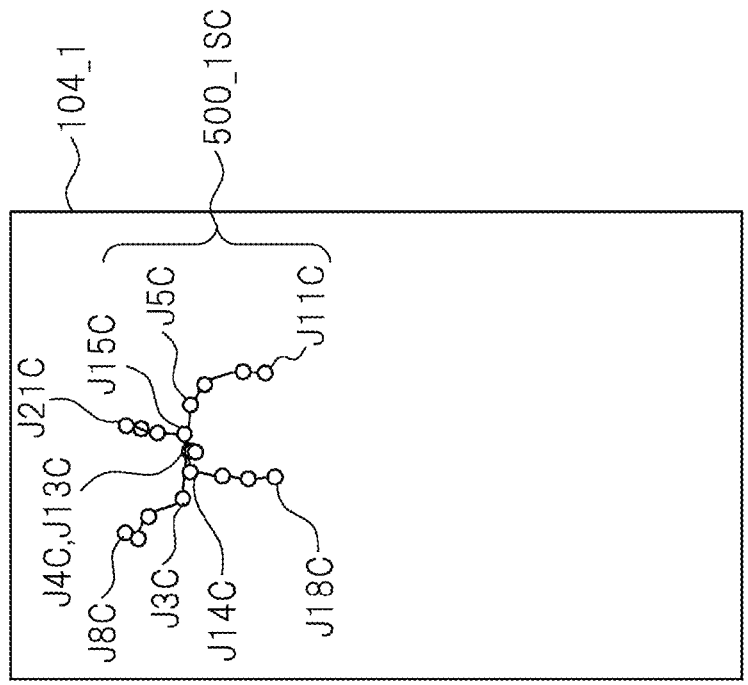
(A)

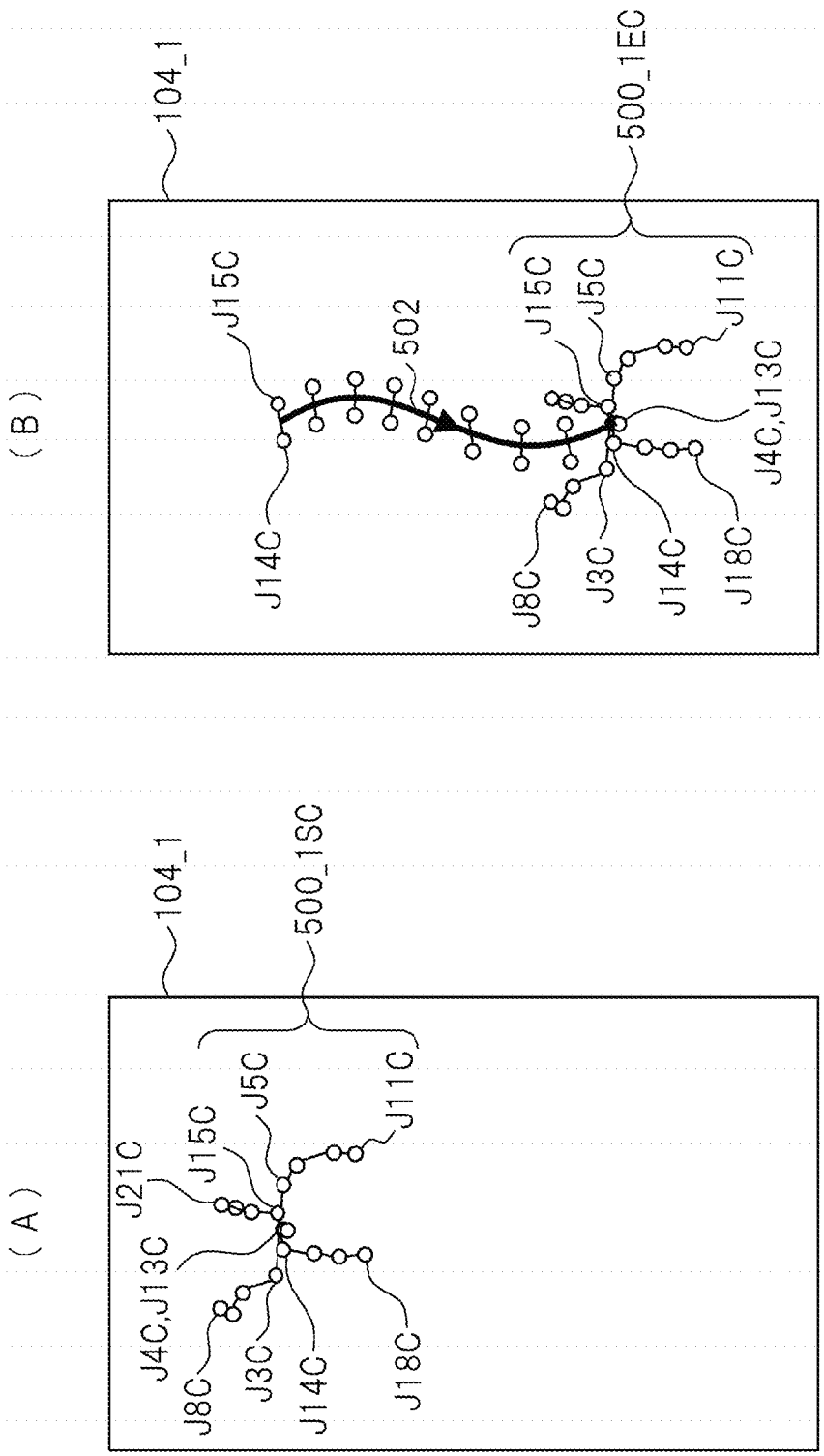
[FIG. 14]

[FIG. 15]
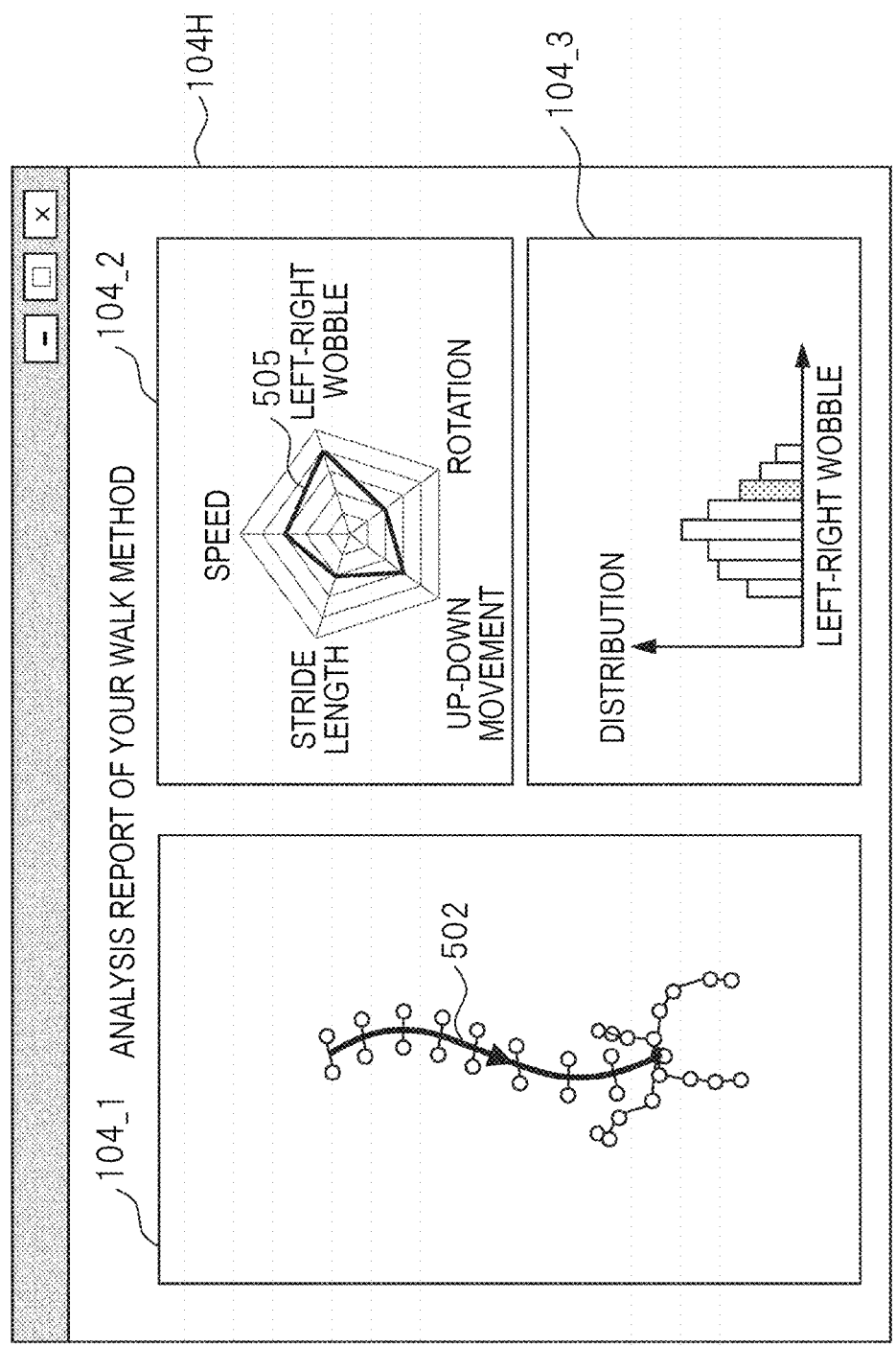

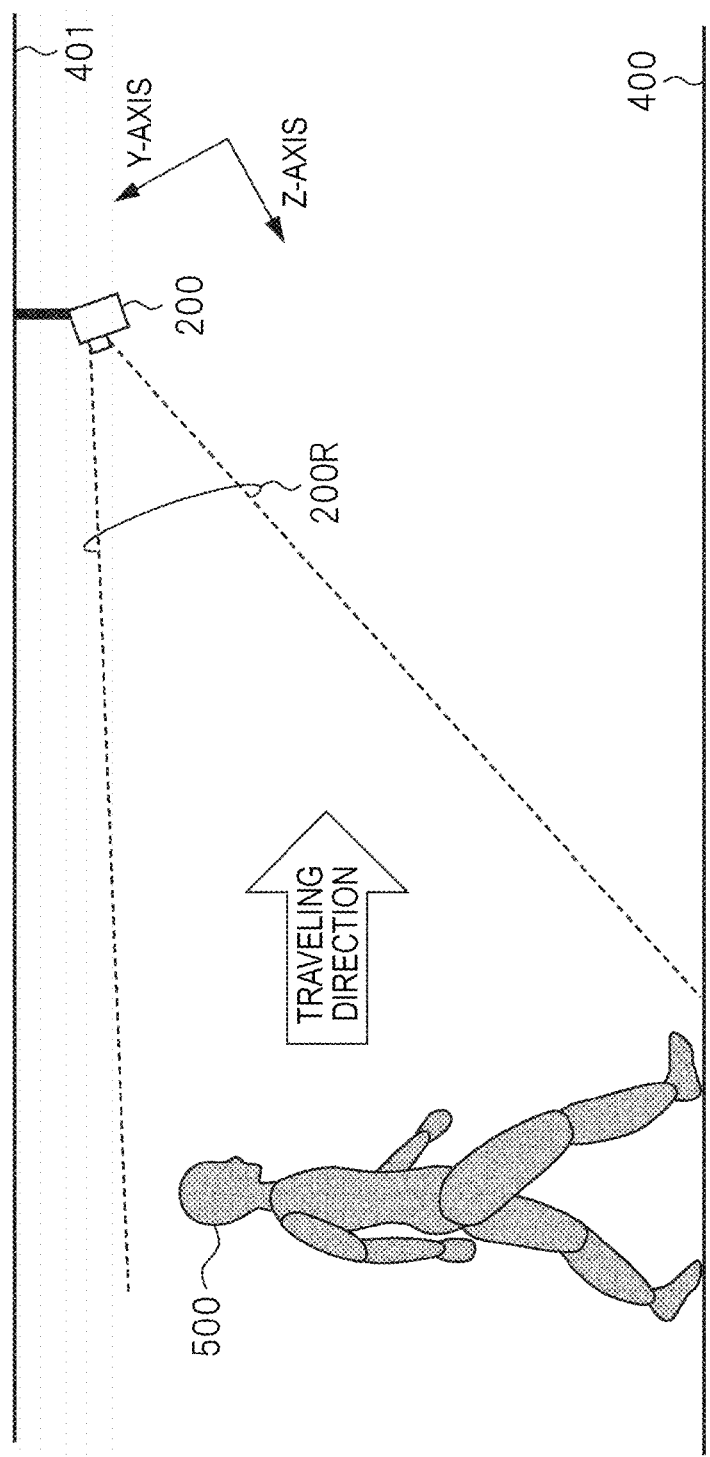
[FIG. 16]

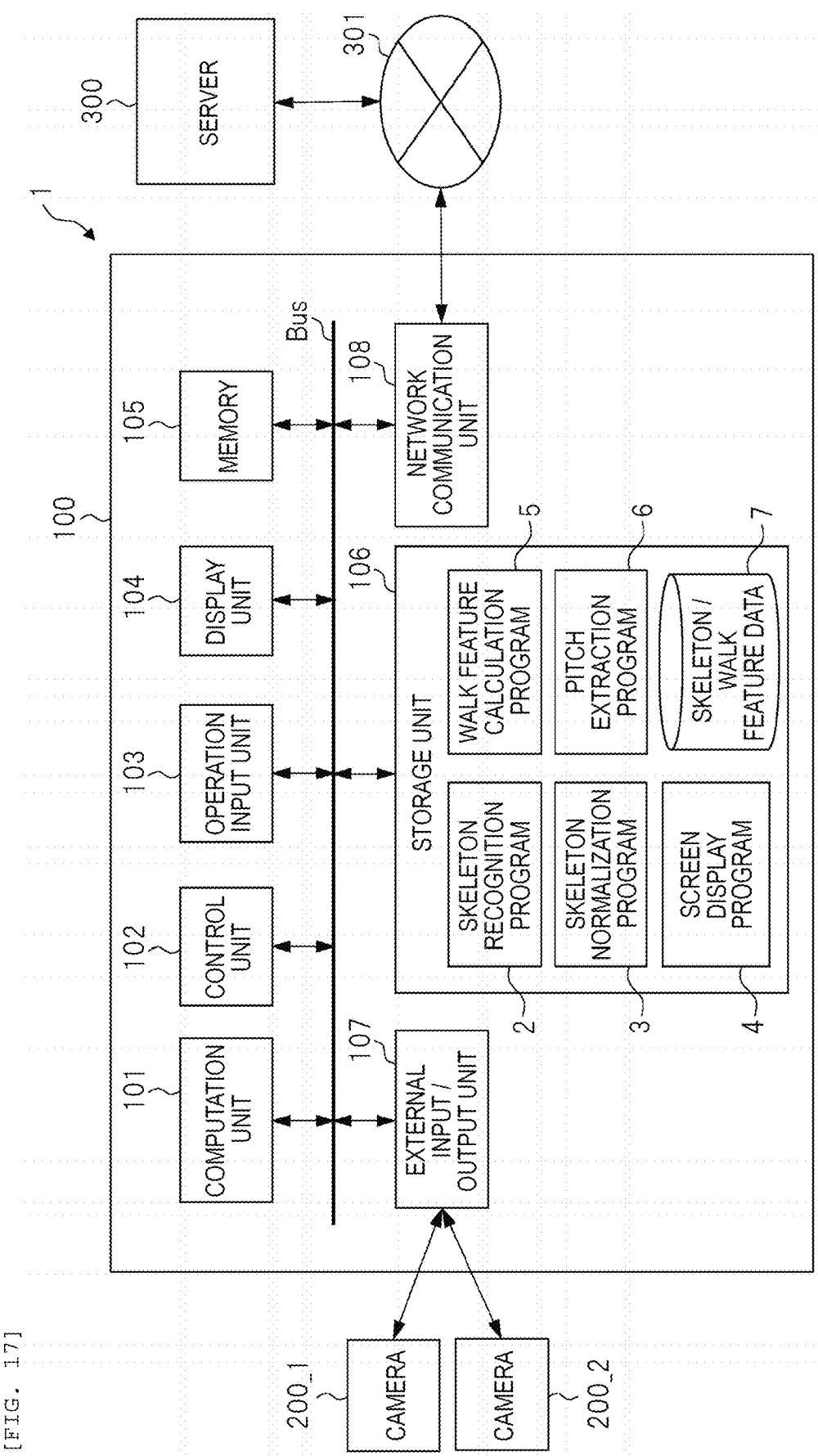
[FIG. 17]

MOTION VISUALIZATION SYSTEM AND THE MOTION VISUALIZATION METHOD

TECHNICAL FIELD

The present invention relates to a motion visualization system and a motion visualization method, and more particularly, to a motion visualization system and a motion visualization method visualizing walk dynamics of a target person.

BACKGROUND ART

Aging is progressing. In an aging society, an increase in locomotive syndrome due to locomotor diseases becomes a social problem. In order to promote extension of healthy life expectancy even in an aging society, it is desirable to detect a deterioration of a motion function of a target person (elderly person or middle-aged elderly person) at an early stage and provide appropriate motion guidance at fitness clubs, rehabilitation facilities, and the like to improve the motion function of the target person.

A motion information processing device displaying a movement trajectory of the target person is disclosed in, for example, PTL 1. PTL 1 discloses displaying the footsteps or the movement trajectory of a predetermined portion of the target person based on coordinates of each portion of the target person extracted from an image.

CITATION LIST

Patent Literature

PTL 1: JP2015-42241A

SUMMARY OF INVENTION

Technical Problem

According to PTL 1, for example, the movement trajectory of a specific portion of a target person can be displayed. However, when the environment in which the target person is measured (observed), for example, the direction in which an image of the target person is formed, or the like is different, measurement data will be different, and thus, for example, even by comparing the movement trajectories, it is difficult to obtain meaningful results.

For example, even when the target person is the same, when the environment in which measurement is performed is different, even by comparing the movement trajectory before and after the passage of time or before and after instructional intervention such as motion guidance, the improvement due to the passage of time or the instructional intervention is difficult to grasp. In addition, even by comparing the movement trajectory of a plurality of different target persons observed in different environments, the state of the movement trajectory of a specific target person based on the plurality of target persons is difficult to grasp.

An object of the invention is to provide a motion visualization system and a motion visualization method that can compare a plurality of measurement data.

Other objects and novel features of the invention will be clarified from the description of the specification and the accompanying drawings.

Solution to Problem

A brief overview of representative embodiments among the embodiments disclosed in the present application is as follows.

That is, a motion visualization system includes: a skeleton recognition unit obtaining skeleton coordinate information of a target person; a cycle extraction unit extracting a walk cycle of the target person based on the skeleton coordinate information, and a transformation unit transforming a value of the skeleton coordinate information in a reference coordinate system in which a direction in which a predetermined portion of the target person moves is set as an axis of a traveling direction in one walk cycle extracted and transforming the skeleton coordinate information based on information of the target person.

Advantageous Effects of Invention

When briefly describing effects obtained by representative embodiments of the invention disclosed in the present application, a motion visualization system and a motion visualization method that can compare a plurality of measurement data can be provided.

BRIEF DESCRIPTION OF DRAWINGS

FIG. 1 is a block diagram illustrating a configuration of a motion visualization system according to an embodiment.

FIG. 2 is a flowchart illustrating operations of the motion visualization system according to the embodiment.

FIG. 3 is a diagram illustrating a relationship between a depth camera and a target person according to the embodiment.

FIG. 4 is a diagram illustrating the relationship between the depth camera and the target person according to the embodiment.

FIG. 5 is a diagram illustrating skeleton recognition according to the embodiment.

FIG. 6 is a diagram illustrating extraction of one walk cycle according to the embodiment.

FIGS. 7(A) and 7(B) are diagrams illustrating the normalization and the coordinate transformation according to the embodiment.

FIGS. 8(A) and 8(B) are diagrams illustrating the normalization and the coordinate transformation according to the embodiment.

FIGS. 9(A) and 9(B) are diagrams illustrating the coordinate transformation according to the embodiment.

FIG. 10 is a diagram illustrating the walk features obtained by the motion visualization system according to the embodiment.

FIG. 11 is a diagram illustrating the walk features obtained by the motion visualization system according to the embodiment.

FIG. 12 is a diagram illustrating the walk features obtained by the motion visualization system according to the embodiment.

FIGS. 13(A) and 13(B) are diagrams illustrating a method of displaying the walk features according to the embodiment.

FIGS. 14(A) and 14(B) are diagrams illustrating a method of displaying the walk features according to the embodiment.

FIG. 15 is a diagram illustrating a display screen of the motion visualization system according to the embodiment.

FIG. 16 is a diagram illustrating a relationship between the depth camera and the target person according to Modified Example 1 of the embodiment.

FIG. 17 is a block diagram illustrating a configuration of a motion visualization system according to Modified Example 2 of the embodiment.

DESCRIPTION OF EMBODIMENTS

Embodiments will be described with reference to the drawings. In addition, the embodiments described below do not limit the invention according to the claims, and all of the elements described in the embodiments and combinations thereof are not necessarily essential to the solving means of the invention.

EMBODIMENT

<Configuration of Motion Visualization System>

FIG. 1 is a block diagram illustrating a configuration of a motion visualization system according to an embodiment. In FIG. 1, reference numeral 1 denotes a motion visualization system. The motion visualization system 1 includes, but especially not limited, a computer 100, a depth camera 200, an Internet line 301, and a server 300 connected to the computer 100 through the Internet line 301. Herein, the example where the motion visualization system 1 includes the Internet line 301 and the server 300 will be described, but the motion visualization system 1 is not limited thereto. For example, the motion visualization system 1 may be configured by the computer 100 and the depth camera 200 excluding the Internet line 301 and the server 300.

The computer 100 includes a computation unit 101, a control unit 102, an operation input unit 103, a display unit 104, a memory 105, a storage unit 106, an external input/output unit 107, and a network communication unit 108 connected to a bus Bus. The control unit 102 reads out a program or the like stored in advance in the storage unit 106 to, for example, the memory 105 and executes the program read out to the memory 105. Of course, the control unit 102 may execute a program stored in advance in the storage unit 106 without reading the program to the memory 105. In this case, the memory 105 is used, for example, as a work memory when executing the program.

The computation unit 101 is used to perform computation when the program is executed by the control unit 102. In addition, the external input/output unit 107 is also used when the program is executed by the control unit 102. In the embodiment, the depth camera 200 is connected to the external input/output unit 107. By executing the program, the control unit 102 controls the depth camera 200 by using the external input/output unit 107 and obtains image data formed by the depth camera 200 through the external input/output unit 107.

The operation input unit 103 includes, for example, a keyboard and a mouse and performs input to the computer 100 by using the keyboard and the mouse. The display unit 104 includes a monitor such as a liquid crystal display for displaying images and displays the images and the like generated by the computer 100. The network communication unit 108 is connected between the bus Bus and the Internet line 301 and performs communication between the computer 100 and the server 300. For example, the data generated by the computer 100 is transmitted to the server 300 through the network communication unit 108 and the Internet line 301 and stored in the server 300. The data stored in the server 300 is supplied to the computer 100 through the network communication unit 108 and the Internet line 301 and used when executing the program.

The storage unit 106 is configured by, for example, a hard disk or an SSD (Solid State Drive). The storage unit 106 stores a plurality of programs. In addition, the storage unit 106 stores the data generated by executing the program and/or the data used when executing the program. Although the plurality of programs and the data are stored in the storage unit 106 as described above, FIG. 1 illustrates only the programs and data necessary for illustrating the embodiment.

In FIG. 1, reference numeral 2 denotes a skeleton recognition program, reference numeral 3 denotes a skeleton normalization program, reference numeral 4 denotes a screen display program, reference numeral 5 denotes a walk feature calculation program, and reference numeral 6 denotes a pitch (walk cycle) extraction program. In FIG. 1, reference numeral 7 denotes the skeleton/walk feature data stored in the storage unit 106.

The control unit 102 executes the programs 2 to 6 described above, so that functional units constituting the motion visualization system 1 are realized in the computer 100. That is, a skeleton recognition unit is configured in the computer 100 by executing the skeleton recognition program 2, a transformation unit is configured in the computer 100 by executing the skeleton normalization program 3, a cycle extraction unit is configured in the computer 100 by executing the pitch extraction program 6 and a walk feature calculation unit is configured in the computer 100 by executing the walk feature calculation program 5.

By executing the screen display program 4, an image generated by, for example, the walk feature calculation program 5 is displayed on the display unit 104. In addition, for example, the data generated by executing the skeleton recognition program 2, the skeleton normalization program 3, the walk feature calculation program 5, and the pitch extraction program 6 are stored in the storage unit 106 as the skeleton/walk feature data 7.

The skeleton/walk feature data 7 stored in the storage unit 106 is supplied to the server 300 via, for example, the network communication unit 108 and the Internet line 301. Alternatively, the data stored in the server 300 is supplied to the storage unit 106 through the Internet line 301 and the network communication unit 108 and stored as the skeleton/walk feature data 7.

The motion visualization system 1 according to the embodiment images the state of the target person of measurement (target person) walking with the depth camera 200, observes the changes in the skeleton of the target person accompanying the walk based on the image obtained by the imaging, and displays the walk features of the target person, for example, on the display unit 104.

<Operation of Motion Visualization System>

FIG. 2 is a flowchart illustrating the operations of the motion visualization system according to the embodiment. The operations of the motion visualization system 1 illustrated in FIG. 1 will be described below with reference to FIGS. 1 and 2.

At step S0, the operations of the motion visualization system 1 start. By starting the operation, the control unit 102 starts executing the skeleton recognition program stored in the storage unit 106. Accordingly, image (depth) capturing in step S1 and skeleton recognition of each frame in step S2 are executed. It is noted that, hereinafter, in some cases, step S1 and step S2 may be collectively referred to as a skeleton recognition process.

In the image capturing in step S1, the image of the target person while walking is continuously formed by using the depth camera 200. An imaging state of the target person by the depth camera 200 will be described with reference to the drawings. FIGS. 3 and 4 are diagrams illustrating a relationship between the depth camera and the target person according to the embodiment. Herein, FIG. 3 is a diagram of the depth camera 200 and the target person viewed from the lateral direction, and FIG. 4 is a diagram of the depth camera 200 and the target person viewed from the above. In FIGS. 3 and 4, reference numeral 500 denotes a target person, and the target person 500 walks on the floor surface 400 of the room in the traveling direction indicated by the arrow. The depth camera 200 is provided on the floor surface 400 by a fixing member 201 such as a tripod, although not particularly limited. In addition, in FIGS. 3 and 4, reference numeral 200R denotes an imaging range of the depth camera 200, the Z-axis indicates the depth direction of the depth camera 200 (direction along the optical axis of a lens of the depth camera 200), the Y-axis indicates the up-down direction (Y-axis perpendicular to the Z-axis) along the lens surface of the depth camera 200, and the X-axis indicates the left-right direction (X-axis perpendicular to the Z-axis and the Y-axis) along the same lens surface. Although not particularly limited, the center of the lens surface of the depth camera 200 is the starting point (0, 0, 0) of the X, Y, and Z axes. Of course, the starting points of the X-axis, Y-axis and Z-axis are not limited thereto. For example, the starting point (0) of the Y-axis may be the floor surface 400. In addition, reference numeral 401 denotes the ceiling surface of the room.

For example, when the target person is instructed to walk toward the lens surface of the depth camera 200, the target person may become tense and enter an unusual walk state. Therefore, as illustrated in FIG. 4, the target person 500 is instructed to walk in a direction that is deviated from the lens surface of the depth camera 200. As a result, as illustrated in FIG. 4, the traveling direction of the target person 500 does not match the Z-axis, which is the depth direction of the depth camera 200.

The depth camera 200 continuously forms images of the target person walking in the traveling direction. The plurality of frames (image data) obtained by continuous image formation are temporarily stored in, for example, the storage unit 106 through the external input/output unit 107.

In step S2, the control unit 102 uses, for example, the computation unit 101 to execute a skeleton recognition process of recognizing the skeleton of the target person for each of the plurality of frames temporarily stored in the storage unit 106. FIG. 5 is a diagram illustrating the skeleton recognition according to the embodiment. By executing step S2, the joint coordinates of the target person 500 are obtained as illustrated in FIG. 5. In FIG. 5, as an example, the obtained joint coordinates (skeleton coordinates) are illustrated as J1 to J21. For example, reference numerals J3 to J5 denote joint coordinates of the shoulder, and reference numerals J13 to J15 denote joint coordinates of the pelvis. The values of the joint coordinates J1 to J21 at this time are the values of the coordinate system related to the depth camera 200. That is, the values (x, y, z) of the joint coordinates J1 to J21 are the values on the X-axis, Y-axis, and Z-axis. The joint coordinates as illustrated in FIG. 5 are obtained for each frame by executing step S2. The joint coordinates obtained herein are stored in the storage unit 106 as, for example, the skeleton/walk feature data 7.

Following step S2, the extraction of one walk cycle (cycle extraction process) of step S3 is performed. That is, the control unit 102 executes the pitch extraction program 6 stored in the storage unit 106. In the pitch extraction program 6, the cycle of one walk of the target person is extracted by using the joint coordinates obtained for each frame. FIG. 6 is a diagram illustrating the extraction in one walk cycle according to the embodiment. The pitch extraction program 6 determines the walk states 500_1 to 500_6 of the target person for each frame based on the obtained joint coordinates. In the embodiment, although not particularly limited, the walk state 500_1 in which the right foot is forward and both legs are open is set as the starting point and the ending point of the walk, and the interval between the starting point and the ending point is extracted as one walk cycle (one pitch). Of course, the invention is not limited to the starting point and the ending point, and any walk state may be used as the starting point and the ending point. In addition, in the following description, the walk state at the starting point is denoted by reference numeral 500_1S, and the walk state at the ending point is denoted by reference numeral 500_1E.

In the next step S4, the control unit 102 obtains a straight line connecting the walk state 500_1S of the starting point and the walk state 500_1E of the ending point and extracts the obtained straight line as an axis (traveling axis) in the traveling direction. For example, the control unit 102 extracts a straight line connecting the joint coordinates J13 of the pelvis in the walk state 500_1S and the joint coordinates J13 of the pelvis in the walk state 500_1E as the traveling axis. Of course, the invention is not limited to the joint coordinates of the pelvis. Although not particularly limited, the extraction of the traveling axis in step S4 is performed in a portion of the pitch extraction program 6. Of course, the extraction of one walk cycle and the extraction of the traveling axis may be executed by separate programs.

Following step S4, in the embodiment, step S5 of normalizing the length of the XYZ axes based on the unit length (torso length), step S6 of performing the coordinate transformation so that the Z-axis overlaps the traveling axis, and step S7 of performing the coordinate transformation so that the ground contact surfaces of both legs are parallel to the X-axis are executed. These steps S5 to S7 are realized by the control unit 102 executing the skeleton normalization program 3 stored in the storage unit 106. The program performing extraction of the traveling axis described above may be a portion of step S6. In this case, step S6 can be considered to be a coordinate transformation process. Next, steps S5 to S7 will be described in detail with reference to the drawings.

<<Normalization and Coordinate Transformation>>

FIGS. 7 and 8 are diagrams illustrating the normalization and the coordinate transformation according to the embodiment. Herein, FIG. 7 is a view of the walk of the target person 500 viewed from the lateral direction (X-axis direction), and FIG. 8 is a view of the walk of the target person 500 viewed from the above (Y-axis direction).

In step S5, the values of the joint coordinates of the target person 500 are transformed based on the information (reference data) of the target person 500. As the reference data, the height, the stride length, the length of a predetermined portion, and the like of the target person 500 can be used. Herein, the case where the length of the predetermined portion of the target person 500 is used as the reference data will be described. In addition, as the predetermined portion, the torso length of the target person 500 is exemplified.

The torso length of the target person 500 is the length between the joint coordinates J3 to J5 of the shoulder and the joint coordinates J13 to J15 of the pelvis. As the reference data, the length (torso length) between the joint coordinates of the shoulder and the joint coordinates of the pelvis in one frame may be used, in the embodiment, the average value of the torso length in one walk cycle is used as the reference data. In step S5, the values (x, y, z) of the joint coordinates on the X-axis, the Y-axis, and Z-axis are transformed to the values when the reference data is set as a unit length (for example, 1). That is, by executing step S5, the values of the respective joint coordinates are normalized with the torso length of the target person 500 as a reference.

As described with reference to FIG. 4, the Z-axis in the depth direction is different from the traveling direction of the target person 500. That is, the direction of the Z-axis is different from the direction of the traveling axis obtained in step S4. In step S6, the values of each joint coordinate are coordinate-transformed so that the traveling axis extracted in step S4 overlaps the Z-axis. That is, the values of each joint coordinate are coordinate-transformed in a reference coordinate system in which the Z-axis is the traveling direction indicated by the traveling axis.

Next, the states before and after the normalization and the coordinate transformation are described with reference to FIGS. 7 and 8. FIG. 7(A) illustrates the view before the normalization and the coordinate transformation are performed, and FIG. 7(B) illustrates the view after the normalization and the coordinate transformation are performed.

In FIG. 7(A), similarly to FIG. 5, the joint coordinates are indicated by "O" in the walk states 500_1S, 500_4, and 500_1E. In addition, as an example, the joint coordinates of the shoulder and the joint coordinates of the pelvis are denoted by reference numerals J3 to J5 and J13 to J15. Before the normalization, the units for the Z-axis and Y-axis are meters (m). In addition, reference numeral 501 denotes a traveling axis connecting the starting point and the ending point with respect to the joint coordinates of the pelvis. The traveling direction is indicated by an arrow on the traveling axis 501. In FIG. 7(A), the traveling axis 501 is oriented in the direction in which the values of the Y-axis and the Z-axis decrease. That is, the target person 500 walks in the direction in which the values on the Y-axis and the Z-axis decrease.

Since the normalization is performed in step S5, the joint coordinates (for example, J3 to J5 and J13 to J15) in the walk states 500_1 and 500_4 are transformed to the joint coordinates (J3C to J5C and J13C to J15C) by setting the torso length as the reference data (unit length), as illustrated in FIG. 7(B). Of course, in FIG. 7(B), the unit of the Y-axis and Z-axis is the torso length. In addition, since the coordinate transformation is performed in step S6, the traveling axis 501 and the Z-axis overlap. In FIG. 7(B), reference numerals 500_1SC, 500_4C, and 500_1EC denote walk states after transformation. Since the traveling axis 501 overlaps the Z-axis, the changes in the walk state due to the walk are along the Z-axis.

FIG. 8(A) illustrates the image before the normalization and the coordinate transformation are executed, and FIG. 8(B) illustrates the image after the normalization and the coordinate transformation are executed. As can be understood from FIG. 8(A), when viewed from the above, the target person 500 walks in a direction in which the Z-axis value decreases and the X-axis value increases. By performing steps S5 and S6, changes in the walk states 500_1SC, 500_4C, and 500_1EC due to the walk are along the Z-axis, and the joint coordinates of the target person are normalized in units of torso length.

<<Coordinate Transformation Related to Inclination>>

FIG. 9 is a diagram illustrating the coordinate transformation according to the embodiment. Herein, FIG. 9(A) illustrates the state before step S7 is executed, and FIG. 9(B) illustrates the state after step S7 is executed.

In the embodiment, as illustrated in FIG. 3, the depth camera 200 is provided on the floor surface 400 by the fixing member 201. It is considered that, according to the method of installing the depth camera 200 and/or the fixing member 201, the depth camera 200 may be tilted left and right with respect to the floor surface 400. In this case, in the frame obtained by the depth camera 200, the target person is tilted with respect to the X-axis as illustrated in FIG. 9(A). As a result, the X coordinate of each joint coordinate recognized in step S2 is not along the X-axis of the floor surface 400. When the joint coordinates J13 to J15 of the pelvis are exemplified, the X coordinates of the joint coordinates are not along the X-axis as illustrated in FIG. 9(A).

In step S7, the X coordinate of each joint coordinate of the target person is transformed so as to be parallel to the floor surface 400 (X-axis). Accordingly, as illustrated in FIG. 9(B), the joint coordinates J13 to J15 of the pelvis are transformed to the joint coordinates J13C to J15C having X coordinates parallel to the floor surface 400. Although the joint coordinates of the pelvis have been described as an example, other joint coordinates are similarly transformed in step S7. Accordingly, the transformation is implemented, for example, by transforming the Y-axis value of each joint coordinate so that the difference in the Y-axis value between the joint coordinates J14C and J15C becomes smaller.

In the embodiment, as illustrated in FIG. 2, the normalization and the coordinate transformation are performed in the order of normalization (step S5) and the coordinate transformation (steps S6 and S7). However, the invention is not limited thereto, and for example, the normalization in step S5 may be performed after performing the coordinate transformations in steps S6 and S7. Returning to FIG. 2, the operations of the motion visualization system will be described.

After step S7, the walk feature calculation (walk feature calculation process) of step S8 is performed. That is, the control unit 102 illustrated in FIG. 1 executes the walk feature calculation program 5 stored in the storage unit 106. In this the walk feature calculation program 5, calculation is performed by using each joint coordinate obtained by executing steps S5 to S7, that is, each joint coordinate on which the normalization and the coordinate transformation are performed.

With the walk feature calculation program 5, various features of the target person 500 accompanying the walk can be obtained. Herein, as an example of the walk features, left-right wobble during the walk, up-down movement during the walk, and rotation of the predetermined portion will be described.

<<Walk Features>>

FIGS. 10 to 12 are diagrams illustrating the walk features obtained by the motion visualization system according to the embodiment. Herein, FIG. 10 is a diagram illustrating the left-right wobble of the target person 500, FIG. 11 is a diagram illustrating the rotation of the predetermined portion of the target person 500, and FIG. 12 is a diagram illustrating the up-down movement of the target person. In FIGS. 10 to 12, reference numerals J3C to J5C, J8C, J11C, J13C to J15C, J18C, and J21C denote joint coordinates obtained by applying the normalization and the coordinate transformation described above to the joint coordinates J3 to J5, J8, J11, J13 to J15, J18, and J21 illustrated in FIG. 5.

<<<Wobble>>>

In FIG. 10, reference numeral 502 denotes a movement trajectory (wobble trajectory) of the predetermined portion in the X direction when the target person 500 walks for one cycle. The movement trajectory 502 is calculated by executing the walk feature calculation program 5. Herein, the joint coordinates J13C of the pelvis are used as the predetermined portion. Therefore, the movement trajectory 502 indicates the transition of movement when the target person 500 walks in one walk cycle. When the target person 500 walks in one walk cycle, if the target person 500 does not wobble left and right, the movement trajectory 502 is parallel to the Z-axis or overlaps the Z-axis. However, if the target person 500 wobbles left and right, as illustrated in FIG. 10, the movement trajectory 502 becomes a curve changing left and right across the Z-axis. Of course, in some cases, the movement trajectory 502 changes only left or right. Accordingly, the presence or absence of wobble of the target person 500 and the magnitude (value) of the wobble can be specified.

Herein, although the movement of the joint coordinates J13C of the pelvis between the walk states 500_1SC and 500_1EC is used to calculate the movement trajectory 502, the invention is not limited thereto. For example, the movement of the joint coordinates j4C of the shoulder may be used to calculate the movement trajectory 502.

<<<Rotation of Predetermined Portion>>>

In FIG. 11, reference numeral 503 denotes a rotation line. In FIG. 11, the rotation line 503 is a straight line connecting the X coordinates of the joint coordinates J13C to J15C of the pelvis. The angle between the rotation line 503 and the virtual line VL perpendicular to the Z-axis is calculated as the rotation angle of the pelvis. This rotation line 503 and the rotation angle of the pelvis are calculated by executing the walk feature calculation program 5. By calculating the rotation angle of the pelvis at each timing during a time period in which the target person 500 walks in one walk cycle, the transition of the rotation of the pelvis can be grasped.

Although the rotation angle of the pelvis is described as an example in FIG. 11, the invention is not limited thereto. For example, the rotation angle of the shoulder may be calculated, and the transition may be grasped.

<<<Up-Down Movement>>>

In FIG. 12, reference numeral 504 denotes a up-down movement trajectory. The up-down movement trajectory 504 indicates a movement trajectory of the predetermined portion in the Y direction when the target person 500 walks in one walk cycle. This up-down movement trajectory 504 is calculated by executing the walk feature calculation program 5. Herein, the joint coordinates J13C of the pelvis are used as the predetermined portion. Therefore, the up-down movement trajectory 504 indicates a transition of up-down movement when the target person 500 walks in one walk cycle. When the target person 500 does not move up and down while walking in one walk cycle, the up-down movement trajectory 504 has a constant value on the Y axis. However, when the target person 500 changes up and down while walking, as illustrated in FIG. 12, the up-down movement trajectory 504 becomes a curve changing in the Y-axis direction. Accordingly, the presence or absence of the up-down movement and the magnitude of the up-down movement of the target person 500 can be grasped. Although the joint coordinates J13C of the pelvis are used in FIG. 12, the invention is not limited thereto. For example, the joint coordinates j4C of the shoulder may be used.

The various walk features calculated in step S8 are stored in the storage unit 106 as the skeleton/walk feature data 7.

In step S9 subsequent to step S8, the processing up to the calculation of the walk features ends. Thereafter, the user operates, for example, the operation input unit 103 (FIG. 1) to instruct the motion visualization system 1 to display the walk features. According to this instruction, the control unit 102 (FIG. 1) executes the screen display program 4 (FIG. 1).

Next, an example of the walk features displayed on the display unit 104 (FIG. 1) by executing the screen display program 4 (display process) will be described with reference to the drawings. FIGS. 13 and 14 are diagrams illustrating a method of displaying the walk features according to the embodiment.

FIG. 13 illustrates a display method for displaying the left-right wobble of the target person based on the skeleton/walk feature data 7. In FIG. 13, reference numeral 104_1 denotes a partial display area on the display screen of the display unit 104. The screen display program 4 displays the transition of the joint coordinates and the wobble trajectory 502 regarding the left-right wobble in the display area 104_1 like an animation. That is, the joint coordinates and the wobble trajectory 502 that change over the passage of time are displayed in the display area 104_1. The joint coordinates in the initial walk state 500_1SC of one walk cycle are displayed as illustrated in FIG. 13(A). After that, the joint coordinates and the wobble trajectory 502 that change with the passage of time are sequentially displayed in the display area 104_1, and as illustrated in FIG. 13(B), the joint coordinates and the wobble trajectory 502 in the final walk state 500_1EC of one walk cycle are displayed.

Although an example where changes in the joint coordinates are also displayed on the display area 104_1 has been described, the invention is not limited thereto. For example, only the joint coordinates of the initial walk state 500_1SC and the final walk state 500_1EC, and the wobble trajectory 502 may be displayed on the display area 104_1. By performing the display as illustrated in FIG. 13, the left-right wobble of the target person can be presented.

FIG. 14 is similar to FIG. 13. The difference is that the joint coordinates J14C, J15C and the rotation line of the pelvis are displayed together with the wobble trajectory 502 in FIG. 14. That is, the joint coordinates J14C and J15C of the pelvis in one walk cycle and the rotation line (straight line connecting the joint coordinates J14C and J15C) are continuously displayed in time series.

Accordingly, changes in rotation of the pelvis of the target person in one walk cycle can be presented.

Although FIG. 14 illustrates rotation of the pelvis, the invention is not limited thereto. For example, instead of the joint coordinates of the pelvis, the joint coordinates J3C and J5C of the shoulder and the rotation line (straight line connecting the joint coordinates J3C and J5C) may be continuously displayed. Accordingly, changes in rotation of the shoulder can be presented.

Although not particularly limited, in FIGS. 13 and 14, the number of walk states displayed on the display area 104_1 is set to a predetermined number, for example, 10, and the walk states at the same time interval are displayed.

Although an example of displaying the walk features based on the joint coordinates obtained by the walk of the target person has been described above, the invention is not limited thereto. For example, display using the walk features obtained from the joint coordinates obtained by measuring the plurality of target persons, or the walk features obtained from the joint coordinates obtained by measuring the same target person in different environments or at different times may be performed. Next, an example of display using the walk features obtained from the joint coordinates obtained by measuring the plurality of target persons will be described with reference to drawings. Herein, it is also assumed that the processing illustrated in FIG. 2 is performed on the walk features of the plurality of target persons with respect to the obtained joint coordinates.

FIG. 15 is a diagram illustrating a display screen of the motion visualization system according to the embodiment. In FIG. 15, reference numeral 104H denotes a display screen displayed on the display unit 104 by executing the screen display program 4. The display screen 104H has a plurality of display areas 104_1 to 104_3, and different contents are displayed simultaneously in each of the display areas. In the example illustrated in FIG. 15, the contents described with reference to FIG. 14 are displayed in the display area 104_1.

A radar chart using the walk features is displayed in the display area 104_2. Items on the radar chart are the walk speed (velocity), stride length, up-down movement, rotation, and left-right wobble of the target person. The value of each item is set based on the walk features of the plurality of target persons, and the walk features of the target person (specific target person) measured this time are indicated by a feature line 505.

In addition, among the walk features, the left-right wobble is displayed in the display area 104_3, by a bar graph. According to the number of target persons of which the values of left-right wobble fall within a predetermined range, a left-right wobble distribution map is formed and displayed in the display area 104_3. In addition, to which distribution the left-right wobble of the target person (specific target person) measured this time belongs is clarified by, for example, a color (dots in FIG. 15).

In this way, by displaying a comparison with the plurality of target persons as a reference, the positions of the plurality of target persons can be presented to the current target person.

In addition, the previous walk features of the current target person may be superimposed and displayed on the radar chart (display area 104_2). Similarly, the previous left-right wobble may be displayed in a different color in the bar graph (display area 104_3). Accordingly, improvements due to for example, the passage of time and/or the instructional intervention are allowed to be presented to the current target person.

For example, it is desirable that the number and intervals of walk states displayed in the display area 104_1 are the same among the target persons so that comparison can be performed among the plurality of target persons. It is desirable to keep the number and intervals of the walk states displayed in the display area 104_1 the same when displaying the same target person a plurality of times.

Although the walk features of the plurality of target persons, the previous walk features of the same target person, and/or the walk features of the same target person in different environments may be stored, for example, in the storage unit 106 illustrated in FIG. 1, the walk features may be stored in the server 300. When stored in the server 300, by receiving the walk features as needed in the motion visualization system 1 through the Internet line 301, display of the walk features illustrated in FIG. 15 can be performed. In this case, even when the storage capacity of the storage unit 106 is limited, comparison with many target persons is possible.

Modified Example 1

FIG. 16 is a diagram illustrating a relationship between the depth camera and the target person according to Modified Example 1 of the embodiment.

In Modified Example 1, the depth camera 200 is fixed to the ceiling surface 401 instead of being provided on the floor surface 400. In this case, the target person 500 can be instructed to walk toward the lens surface of the depth camera 200. Accordingly, when the traveling direction of the target person 500 overlaps the Z-axis, steps S4 and S6 illustrated in FIG. 2 can be omitted.

Modified Example 2

FIG. 17 is a block diagram illustrating a configuration of a motion visualization system according to Modified Example 2 of the embodiment.

FIG. 17 is similar to FIG. 2. The difference is that the depth camera 200 is changed to stereo cameras 200_1 and 200_2. Since the distance and the like between the target person 500 and the cameras can be grasped by using the two cameras 200_1 and 200_2, the depth camera needs not to be used. In addition, a compound eye camera can also be used as the two cameras 200_1 and 200_2.

According to Embodiment 1, the values of the joint coordinates are normalized based on the information (reference data) of the target person. By normalizing the joint coordinates of the plurality of target persons based on the respective information (reference data), meaningful comparisons of movement trajectories among the plurality of target persons can be performed. In addition, even in the case of the same target person, even when the environment changes and/or time has passed, by normalizing the joint coordinates based on the same reference data, the movement trajectory can be compared excluding the influence of the change of the environment and/or the passage of time. Accordingly, the improvement in athletic performance due to the passage of time and/or the improvement due to instructional interventions can be understood.

Furthermore, in the embodiment, the coordinate transformation of the joint coordinates is performed so that the traveling axis of the target person overlaps the Z-axis. Accordingly, the sharing of the Z-axis among the plurality of target persons can be realized. In addition, even when the same target person is measured in different environments, the sharing of the Z-axis can be realized.

That is, the motion visualization system and the motion visualization method capable of comparing a plurality of measurement data (joint coordinates, walk features, and the like) can be provided.

The motion visualization system and the motion visualization method according to Embodiment 1 are particularly useful for the motion instructors instructing the target persons in, for example, fitness clubs, rehabilitation facilities, and the like to be used as users. That is, by allowing the motion instructor to use the motion visualization system and the motion visualization method according to Embodiment 1, the comparison of the plurality of target persons and the target person measured this time can be performed, and the motion instructor can intuitively and quantitatively understand the features of the target person measured this time from the walk features displayed, which can lead to the improvement. In addition, the motion instructor can intuitively and quantitatively understand the improvement due to the passage of time or the instructional intervention. Furthermore, the motion instructor can explain the state of the improvement to the target person while presenting the information illustrated in FIG. 15 to the target person measured this time.

Although FIG. 15 illustrates the example of displaying the walk features in the radar charts and distributions, the invention is not limited thereto. For example, statistical processes such as averaging and variance may be performed on the walk features, and the process results may be displayed.

In addition, when the tilt illustrated in FIG. 9(A) is within the permissible range, step S7 illustrated in FIG. 2 may be omitted.

The invention made by the inventor has been specifically described above based on the embodiment, but the invention is not limited to the above embodiment, and various modifications can be made without departing from the scope of the invention.

REFERENCE SIGNS LIST

1: motion visualization system
2: skeleton recognition program
3: skeleton normalization program
4: screen display program
5: walk feature calculation program
6: pitch extraction program
100: computer
101: computation unit
102: control unit
103: operation input unit
104: display unit
105: memory
106: storage unit
200: depth camera
300: server
500: target person
J1 to J21: joint coordinates
S0 to S9: steps

The invention claimed is:

1. A motion visualization system comprising:
a camera having a z-axis, which is a direction along an optical axis of a lens of the camera;
a controller coupled to the camera; and
a memory storing instructions that when executed by the controller, configures the controller to:
obtain skeleton coordinate information of a target person for each of a plurality of frames captured by the camera,
extract a walk cycle in a traveling direction of the target person based on the skeleton coordinate information,
determine information a predetermined portion of the target person based on the skeleton coordinate information of one of the plurality frames,
transform the skeleton coordinate information in a reference coordinate system where a direction in which the predetermined portion of the target person moves is set as an axis of the traveling direction in one walk cycle extracted by the cycle extraction unit, the traveling direction being different than the z-axis of the camera, and
transform the skeleton coordinate information based on the information of the predetermined portion of the target person, as reference data, so that the z-axis and the traveling direction overlap with one another.

2. The motion visualization system according to claim 1, wherein the information of the target person is a height, a stride length, or a length of the predetermined portion of a body of the target person.

3. The motion visualization system according to claim 2, further comprising:
a display coupled to the processor,
wherein the processor is configured to:
calculate features of a walk of the target person based on the transformed skeleton coordinate information, and
display the features of the walk of the target person on the display.

4. The motion visualization system according to claim 3, wherein the processor is configured to display a movement trajectory of the predetermined portion of the target person accompanying the walk.

5. The motion visualization system according to claim 4, wherein the processor is configured to display changes in rotation of the predetermined portion of the target person in the walk cycle and a wobble of the target person in the one walk cycle.

6. A motion visualization method comprising:
obtaining, by a camera having a z-axis, which is a direction along an optical axis of a lens of the camera, a plurality of frames of a target person walking;
a skeleton recognition process of obtaining changes in skeleton coordinates of the target person for each of the plurality of frames;
a cycle extraction process of extracting a walk cycle in a travelling direction of the target person based on the change in the skeleton coordinates;
determining information a predetermined portion of the target person based on the skeleton coordinate information of one of the plurality frames;
a coordinate transformation process of transforming the skeleton coordinates in a reference coordinate system in which a direction in which the predetermined portion of the target person moves is set as an axis of the traveling direction in one walk cycle extracted in the cycle extraction process, the traveling direction being different than the z-axis of the camera; and
a skeleton normalization process of transforming the skeleton coordinates based on the information of the predetermined portion of the target person, as reference data, so that the z-axis and the traveling direction overlap with one another.

7. The motion visualization method according to claim 6, wherein the information of the target person is a height, a stride length or a length of a predetermined portion of the target person.

8. The motion visualization method according to claim 7, further comprising:
a walk feature calculation process of calculating features of a walk of the target person based on the transformed skeleton coordinates obtained in the coordinate transformation process and the skeleton normalization process; and
a display process of displaying the features of the walk of the target person.

9. The motion visualization method according to claim 8, wherein, in the display process, a movement trajectory of the predetermined portion of the target person accompanying the walk is displayed.

10. The motion visualization method according to claim 9, wherein, in the display process, changes in rotation of the predetermined portion of the target person in the walk cycle and wobble of the target person in the walk cycle are displayed.

* * * * *